June 13, 1933. H. H. HAGLUND 1,914,328
TELEGRAPH REPEATER FOR UNIFORM IMPULSE CODE
Filed Feb. 12, 1930 2 Sheets-Sheet 1

Inventor
Hakon H. Haglund
By his Attorney Eugene C. Brown

June 13, 1933.  H. H. HAGLUND  1,914,328
TELEGRAPH REPEATER FOR UNIFORM IMPULSE CODE
Filed Feb. 12, 1930   2 Sheets-Sheet 2

Inventor
Hakon H. Haglund
By his Attorney
Eugene E. Brown

Patented June 13, 1933

1,914,328

UNITED STATES PATENT OFFICE

HAKON H. HAGLUND, OF FLUSHING, NEW YORK, ASSIGNOR TO THE WESTERN UNION TELEGRAPH COMPANY, OF NEW YORK, N. Y., A CORPORATION OF NEW YORK

TELEGRAPH REPEATER FOR UNIFORM IMPULSE CODE

Application filed February 12, 1930. Serial No. 427,927.

This invention relates to telegraph transmitting and repeating apparatus for a system employing signals of the Baudot code or uniform impulse code type.

The invention is particularly applicable to the transmission of telegraph signals simultaneously to a large number of lines or to a line having a large number of receiving instruments connected therein, or where for any reason it is desirable to transmit a relatively large amount of current, although it is useful in other applications.

One field of application for which the invention is especially suitable, is in the transmission or repeating of ticker signals to a large number of subscribers. In the distribution of quotations for stocks, bonds and other commodities it is the present practice to transmit the signals, corresponding to the quotations, from a single point and to distribute the signals to various parts of the country through an involved and complicated relay system and in the various cities the signals are again distributed, through a series of relays, to a number of subscribers' lines. The current consumption of each receiving ticker is relatively high and the number of tickers which may be operated through a single relay is limited to a small number due to the sparking at the relay contacts. Similar conditions exist in the operation of automatic stock quotation boards from a main distributing center or in the syndicating of news to a large number of subscribers.

It is one of the objects of the present invention to provide a transmitting apparatus suitable for this service which may be operated at a high rate of speed and which will permit the transmission of relatively large amounts of current.

Another object is to provide telegraph transmitting and receiving apparatus by which signals may be distributed to a large number of lines or to a multitude of receiving instruments, by means of a single transmitting device.

A further object is to provide a system of distributing signals to a large number of receiving instruments which does not require the use of a multiplicity of distributing relays.

A still further object is to provide a novel and improved telegraph transmitting system.

Other objects and advantages will appear from the following description taken in connection with the accompanying drawings and appended claims.

In accordance with one embodiment of my invention I employ a rotary transmitter which, if sufficiently high currents are involved, may be operated in an oil or other arc quenching bath and I effect the reversal of current to the segments of the rotary transmitter through one or more gaseous conduction devices, which may contain one or more ionizable gases, metallic vapors or other ionizable medium, of a type, such as the so-called thyratron tubes, which are capable of passing the requisite amount of current and which may be controlled by a relatively small amount of current. The discharge through the gaseous conduction tube may be controlled directly from the contacts of the keyboard transmitter or storage transmitter or through the contacts of an intermediate relay.

The invention is largely dependent upon the characteristics of the gaseous discharge tube whereby the tube normally interposes a high resistance in the circuit in which it is connected but in which this resistance may be broken down by a relatively small current in the auxiliary or control circuit, the tube when its internal resistance is broken down being capable of passing a large amount of current.

A type of tube which I have found particularly satisfactory for this purpose is the so-called thyratron tube described in an article by Dr. Albert W. Hull, entitled "Hot cathode thyratrons" and published in the General Electric Review, vol. 32, #4, of April, 1929, at page 213. This type of tube is in effect an electro-statically controlled arc rectifier and briefly consists of a gas filled envelope containing an electron emitting cathode, a surrounding grid and an anode, the geometry of the tube, nature and pressure of the gas and electron emissivity of the cathode being such that with the proper positive potential applied to the anode, the grid, if negative, will interpose a high starting resistance to the tube but if the grid is rendered positive by a feeble current, the tube will break down and due to the arc discharge then occurring, will allow a large amount of current to flow from the anode to the cathode.

The tube is unlike the ordinary three electrode vacuum tube or audion in that as soon as the plate current starts, the grid has no further influence on the plate current and the discharge can only be stopped by removing or reducing the plate voltage.

This effect is attributed to the formation of a sheath of positive ions around the grid, usually only a fraction of a millimeter in thickness, which contains the entire voltage drop between the grid and the surrounding space. Varying the potential of the grid merely changes the thickness of this sheath without effecting the potential of the remaining space. The action of the grid may, therefore, be likened to a trigger and I have used the term "trigger electrode" in the appended claims to designate an electrode which is effective to initiate the discharge, but which has no further influence on the discharge, the nature of the electrode being thus distinguished from the usual audion grid, which exerts a continuous influence on the discharge through the tube.

In one embodiment of my invention I dispense with the rotary distributor and operate the gaseous conduction tubes directly into the outgoing line. When the signals consist of positive and negative impulses, I employ at least one tube for the signals of each polarity and arrange the circuits for the tubes so that the tube supplying one polarity to the line ceases to operate prior to or at the time of starting of the tube supplying current of the opposite polarity to the line.

In order that the invention may be more fully understood reference will be had to the accompanying drawings in which.

Figure 1:
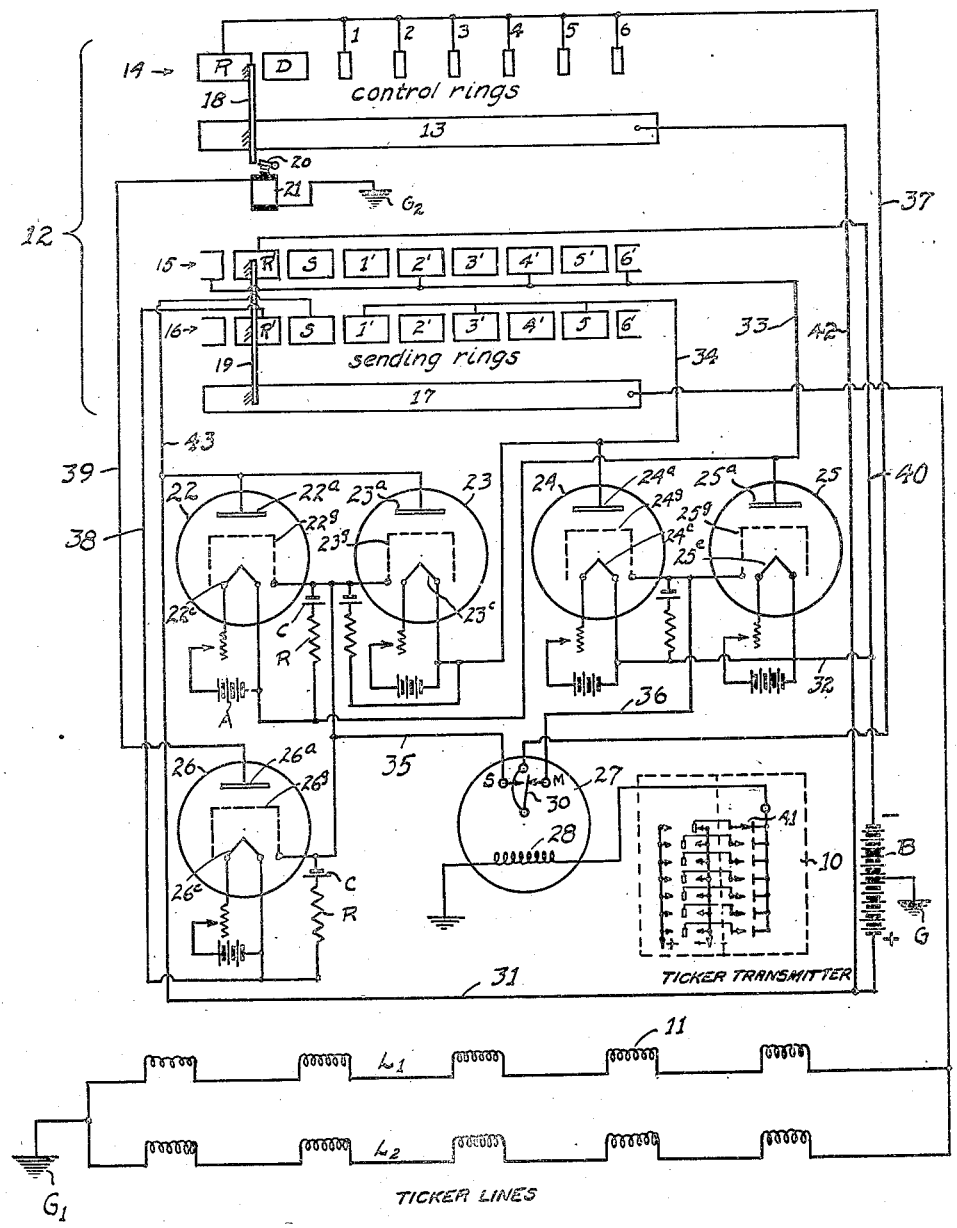
Figure 1 is a circuit diagram of a start-stop transmitting system embodying my invention.

Referring now to Figure 1, I have shown diagrammatically a signal transmitter 10 which may be a keyboard transmitter or a tape or other form of storage transmitter, for producing the code combinations which it is desired to transmit to a plurality of receiving devices, such as news or quotation tickers, the windings of which are designated at 11. The transmitter 10 has been diagrammatically illustrated as of the type disclosed in a copending application of S. W. Rothermel, Serial No. 390,726, filed September 6, 1929 and entitled Distributor-transmitter for simplex telegram circuits.

Each ticker employed in the line materially increases the inductance of the line and, therefore, in order to maintain the transmission characteristics of the line rapid, it is customary to use only a small number of tickers, usually about ten in each line and to operate each line through a separate relay. However, in accordance with my invention I may connect a large number of lines directly in parallel and operate them directly from the segments of a rotary transmitter, which is generally indicated at 12. The current consumption of each ticker line is about one hundred milliamperes and the greatest number that can be employed on one line is about ten, due to the impedance of the tickers and line. The circuits for the ticker lines are completed from the segments of the rotary transmitter directly through one of the gaseous conduction devices, as will presently be described, and since the gaseous conduction devices of the thyratron type, of moderate size, are capable of passing five or more amperes of current, I am able to operate fifty or more ticker lines from a single rotary apparatus. The rotary transmitter may be operated in oil or other arc quenching medium, as is well understood, to prevent detrimental sparking at the segments.

In order to facilitate synchronization and to comply with the operating requirements of the type of tickers now being employed, the rotary transmitter is shown as of the start-stop type and is provided with the correct number of contact segments for transmitting code combinations comprising a start impulse, six character code impulses and a stop or rest impulse.

The transmitter comprises a set of control rings 13 and 14 and a set of sending rings 15, 16 and 17, each set of rings being bridged by brushes 18 and 19 respectively, normally held on their rest segments by a latch 20, controlled by a starting magnet 21, the brushes being adapted to travel in unison around their respective rings.

The ring 14 is provided with a rest segment R, a dead segment D and six character code segments, numbered 1 to 6. Rings 15 and 16 are each provided with a rest segment R', a start segment S and six character code segments 1' to 6'.

Associated with the rotary transmitter are four transmitting tubes 22, 23, 24 and 25 and one tube 26 for controlling the operation of the starting magnet 21. These tubes are of the gaseous conduction type referred to above and are controlled through the contacts of a polarized relay 27, having an operating winding 28 connected to the contacts of the transmitter 10. The tongue 30 of the relay is caused to engage its marking and spacing contacts $m$ and $s$ respectively in accordance with the polarity of the signals transmitted by the transmitter 10.

The tubes 22 and 23 serve to control the application of spacing signals and the tubes 24 and 25 to control the application of marking signals to the sending segments of the transmitter 12. For this purpose the anodes $22^a$ and $23^a$, of tubes 22 and 23, are connected by a conductor 31 to the positive terminal of a battery B, the midpoint of which is grounded at G. Similarly the cathodes $24^c$ and $25^c$, of the tubes 24 and 25, are connected by a conductor 32 to the negative terminal of the battery B. The cathode $22^c$, of tube 22, is connected by a conductor 33 to the even numbered segments 2', 4' and 6' of ring 15 and the cathode $23^c$, of tube 23, is connected by a conductor 34 to the odd numbered segments 1', 3' and 5' of ring 16. Likewise the anode $24^a$, of tube 24, is connected to the odd numbered segments of ring 16 and the anode $25^a$, of tube 25, is connected to the even numbered segments of ring 15.

The grids $22^g$ and $23^g$, of the tubes 22 and 23, are connected by a conductor 35 to the spacing contact $s$ of relay 27 and the grids $24^g$ and $25^g$, of the tubes 24 and 25, are connected by the conductor 36 to the marking contact $m$ of the relay. The tongue 30 of the relay is connected, by conductor 37, to each of the contacts R and 1 to 6 of the ring 14.

The cathode $26^c$, of the tube 26, is connected by a conductor 38 with the rest segment R' of the ring 16 and the anode $26^a$ is connected, by a conductor 39, to one terminal of the starting magnet 21, the opposite terminal of which is grounded at G2. The grid $26^g$ is connected to the spacing contact of the relay 27.

The grid of each of the gaseous discharge tubes is normally maintained at a negative potential by a stabilizing battery C connected between the grid and the cathode through a high resistance R and the cathode of each tube is maintained at an electron emitting temperature in any suitable manner, as by a heating battery A.

The solid ring 17 is connected to the lines L1, L2, etc., which are arranged in parallel and grounded at their distant end at G1.

The operation of the system is as follows:
Assuming the brushes 18 and 19 to be resting on the rest segments R and R', negative or marking battery is continuously supplied to the line from the negative terminal of the battery B, conductor 40, segment R' and ring 17 to the lines L1, L2, etc. At this time the tongue of the relay 27 is maintained on its marking contact through a normally closed contact 41 of the transmitter 10. At the same time the plate circuit for the tube 26 is prepared from the grounded end G of the battery, the negative terminal thereof, conductor 40 to the segment R' and brush 19 of the rings 15 and 16 and thence by conductor 38 to the cathode $26^c$, of the tube 26, and from the anode $26^a$ thereof and the conductor 39, to the starting magnet 21. No current flows in this circuit, however, due to the high resistance imposed by the tube 26, on account of the negative charge maintained on its grid by the stabilizing battery C.

Upon the operation of the transmitter 10, a starting signal of spacing or positive polarity, followed by six character selecting impulses of mixed positive and negative polarity and a final rest impulse of marking or negative polarity are applied to the winding 28 of the relay 27. In response to the starting impulse the relay tongue moves against its spacing contact and in so doing applies a positive charge to the grid of the tube 26, from the positive terminal of the battery B, conductor 42, control ring 13, brush 18, rest segment R, conductor 37, relay tongue 30, spacing contacts and the conductor 35 to the grid $26^g$.

Upon the application of this positive charge to the grid, the tube 26 breaks down and an arc discharge occurs therethrough causing the operation of the starting magnet 21 and thereby releasing the brushes 18 and 19.

As the brush 19 passes on to the starting segment S, a starting impulse is transmitted to the lines L1, L2, etc., directly from the ground G and positive terminal of the battery B, conductors 31 and 43, segment S of ring 16, brush 19 and solid sending ring 17. This signal is continued for the full length of time required for the brush to pass across the segment S.

Upon the continued movement of the brushes, the brush 18 engages segment 1 of ring 14 simultaneously with the engagement of the segments 1' of rings 15 and 16 by the brush 19. At this time positive battery is applied to the grid of tubes 22, 23 or 24, 25 depending upon whether the first signal is of marking or spacing character. If the first signal is marking, the tongue of the relay 27 will have moved back to its marking contact and a circuit will be completed from the positive terminal of the battery B and segment 1 of ring 14, to the marking contact of the relay 27 and thence to the grids of the tubes 24 and 25. The plate circuit of the tube 25 is open at the contact 2' but the plate circuit of the tube 24 is completed from the negative terminal of the battery through the tube 24, segment 1' of ring 16 and the brush 19 to the solid segment 17 and thence to the line. The tube 24, therefore, breaks down and supplies a negative impulse to the line which continues as long as the brush remains upon segment 1'.

If when the brush passes on to segment 2' the tongue of the relay moves to its spacing contact, a positive potential is applied through segment 2 of ring 14 and the tongue of the relay to the grids of tubes 22 and 23, the plate circuit for the tube 22 being completed from the positive terminal of the battery and conductor 31 to the anode of the tube and thence from the cathode by conductor 33 to segment 2' of ring 15 and by brush 19 to the sending ring 17, in such direction as to transmit a positive impulse to the line.

The discharge through the different tubes continues, after it has started, as long as the brush remains upon the segment through which the tube circuit was completed and the discharge ceases as soon as the brush passes from such segment. If two signals of the same polarity occur in succession the first signal will be transmitted through one of the tubes, controlled by that particular polarity and the following signal will be transmitted by the other of said tubes. There will, therefore, always be an interruption in the circuit to a particular tube between successive operations, equal to the time required for the brush to pass over at least one segment of the rotary transmitter.

Inasmuch as each tube is capable of passing a current of several amperes I am able to operate a large number of lines L1, L2, etc., directly therethrough without any intermediate relays and thus effect a large reduction in the expense of operation and in the maintenance of equipment.

I have employed two tubes for supplying impulses of each polarity to the line in order to provide an overlap and to insure that each tube will have the battery removed therefrom for a sufficient length of time to cause the discontinuance of the operation thereof, at the end of the transmission of each signal controlled thereby. The segments 1 to 6 of ring 14 may be made very small since their only function is to apply a positive potential to the grids of the transmitting tubes at the commencement of the signal, to break down the starting resistance of the tubes. Thereafter, the tubes continue to operate irrespective of the condition of the grids until the plate voltage is removed or reduced. The use of two such tubes for controlling the transmission of each polarity of impulses is a precautionary measure which is theoretically unnecessary if the brush 19 is in perfect adjustment since the deionization time of the tubes is a matter of microseconds and would readily take place within the time required for the brush to cross the insulation between two adjacent segments. However, since there is a possibility of the brush engaging two successive segments at the same time, with close spacing thereof, I prefer to employ the arrangement shown.

The brushes 18 and 19 are synchronized with respect to the relay 27 so that they engage their segments 1 to 6 and 1' to 6' at approximately the midpoint of the impulse transmitted to the relay, thereby insuring that the relay will have operated when the brushes pass onto their respective segments. The best part of the received signal is thus utilized to start the discharge tubes, and regardless of the extent of distortion or attenuation of the signals received by the relay, they are regenerated and repeated by the rotary transmitter of full duration.

Figure 2:
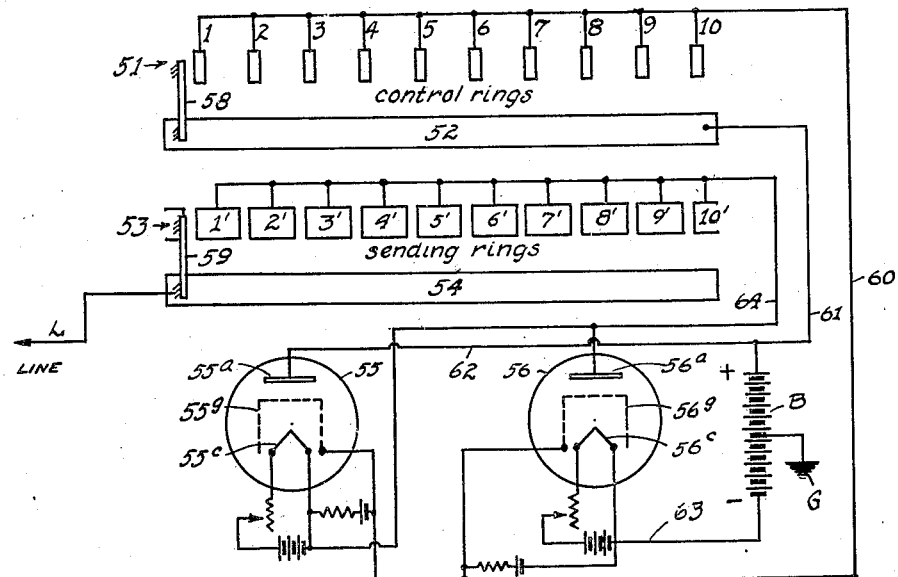
Figure 2 is a circuit diagram of a continuously operating transmitter, such as a multiplex transmitter, embodying the invention.

In Figure 2, however, I have shown a transmitter employing but a single tube for controlling each polarity of signal and arranged for continuous operation as distinguished from start-stop operation. The apparatus shown may constitute a two channel multiplex telegraph system employing a five unit code. The apparatus comprises a pair of control rings 51 and 52, a pair of sending rings 53 and 54, a gaseous discharge tube 55 for applying positive battery to the line, a gaseous conduction tube 56 for applying negative battery to the line and a polarized controlling relay 57.

The ring 56 has ten short segments numbered 1 to 10 and the ring 53 has ten longer segments numbered 1' to 10'. The segments 1' to 10' are spaced a sufficient distance apart to insure the interruption of the current to the transmitting tubes during the passage of the brush from one segment to the succeeding segment.

The rings 51 and 52 are bridged by a brush 58 and the rings 53 and 54 are bridged by a brush 59 both operating in unison. The segments 1 to 10 and 1' to 10' are disposed with respect to the brushes so that the corresponding segments of each ring, as for instance, segments 1 and 1', are engaged simultaneously by the brushes 58 and 59.

The segments 1 to 10 are connected together and are connected to the tongue 30 of the relay by a conductor 60. The solid ring 52 is connected, by a conductor 61, to the positive terminal of the battery. The anode $55^a$, of the tube 55, is joined, by a conductor 62, to the positive terminal of the battery and the cathode $56^c$, of the tube 56, is joined to the negative terminal of the battery by a conductor 63. The cathode $55^c$ and the anode $56^a$ are both connected to each of the segments 1' to 10' by a conductor 64. The grid $55^g$, of the tube 55, is connected to the spacing contact $s$ and the grid $56^g$, of the tube 56, to the marking contact $m$, of the relay 57. The solid sending ring 54 is joined to the outgoing line L.

The operation of the system shown in Figure 2 is similar to that shown in Figure 1. As the brush 58 passes on to each of its segments 1 to 10, a circuit is completed from the positive terminal of battery B, ring 52, one of the segments 1 to 10 and conductor 60 to the tongue 30 of the relay 57 and thence through the spacing contact $s$, of the relay, to the grid of the tube 55 or through the marking contact $m$ of the relay, to the grid of the tube 56, depending upon whether the relay is set to transmit spacing or marking signals. Positive potential is thus applied to the grid of either one or the other of the transmitting tubes.

The plate circuit of the tube 55 extends from the positive terminal of the battery B, by conductor 62, to the anode $55^a$, thence from the cathode $55^c$ by conductor 64 to segments $1'$ to $10'$ and by means of the brush 59, to the sending ring 54, so as to apply a positive potential to the line L. The plate circuit for the tube 56 extends from the negative terminal of the battery to the cathode $56^c$ and thence from the anode $56^a$ by conductor 64 to the contacts $1'$ to $10'$ and by brush 59 to the ring 54 in such a direction as to supply a negative potential to the line L. These circuits are normally incomplete, however, due to the resistance of the transmitting tubes but upon the application of a positive potential to the grids through the segments of the ring 51 and the relay 57, one of the tubes breaks down to supply either the negative or positive impulse to the line. This impulse continues until the brush passes off of the segment of the ring 53, through which the tube circuit was completed.

It will be appreciated, of course, that if it is desired to transmit impulses of the same polarity for marking signals and no current intervals for spacing signals, the gaseous conduction tubes utilized in the foregoing systems, for transmitting signals of one polarity, as for instance positive impulses, may be omitted, the systems otherwise remaining as shown.

Figure 3:
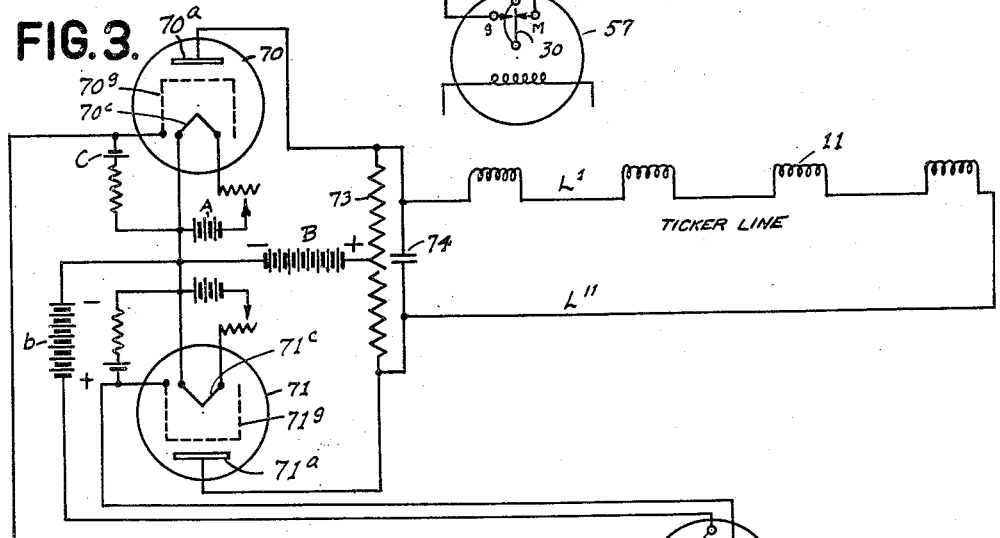
Figure 3 is a circuit diagram of a transmitter, employing the gaseous conduction tubes operating directly into the outgoing line.

In Figure 3 I dispensed with the rotary distributor and operate the tubes directly into the outgoing lines. In this modification I have arranged the circuit for the tubes so that upon the application of a positive potential to the grid of one of the tubes and upon the starting thereof to apply a current of one polarity to the line, the discharge is caused to cease in the other tube.

Two tubes, 70 and 71, are employed, controlled through the contacts of a polarized relay 72. Tube 70 controls the application of negative polarity to the outgoing line and tube 71 controls the application of positive polarity thereto. The cathodes of the tubes are connected together and to the negative terminal of the grid control battery $b$. The grids $70^g$ and $71^g$ are connected to the marking and spacing contacts of the relay 72. The tongue 30 of the relay is connected to the positive terminal of the battery $b$. The usual stabilizing battery C and cathode heating battery A are employed.

The anode $70^a$ and $71^a$ are connected to the opposite ends of a potentiometer 73 bridged by the condenser 74, the outgoing line L' being connected to the anode $70^a$ and the return line L" being connected to the anode $71^a$. The line battery B is connected to the mid-point of the potentiometer and to the cathodes $70^c$ and $71^c$.

The relay 72 may be controlled in any desired manner, as by a key board transmitter 75.

In the operation of the system when the relay 72 moves to its marking contact to transmit a marking impulse, a circuit is completed from the positive terminal of the battery $b$ to tongue 30 of the relay and its marking contact to the grid of the tube 70, thus rendering the grid positive and causing the tube to break down. The plate circuit for the tube extends from the negative terminal of the battery B, cathode and anode of the tube 70, lines L' and L", and the lower half of the potentiometer 73, to the positive terminal of the battery B. A part of the plate current also flows directly through the upper half of the potentiometer to the positive terminal of the battery. The tube 70 continues to operate to supply negative current to the line L' as long as the relay tongue 30 remains away from its spacing contact. When a reversal of the signal current is desired, the tongue 30 is moved to its spacing contact thus restoring the negative charge on the grid of the tube 70 and applying a positive charge to the grid of the tube 71. The tube 71 therefore starts to operate, the plate circuit extending from the negative terminal of the battery B, cathode and anode of the tube 71 and lower half of the potentiometer to the positive terminal of the battery. The condenser 74, which was previously charged from the tube 70 is now subjected to current in the reverse direction and therefore discharges in such direction as to momentarily reduce the voltage in the plate circuit of the tube 70 to approximately zero or below which is sufficient to interrupt the discharge and allow the tube to become deionized. The tube 71 continues to operate, the circuit therefor, dividing at the potentiometer and part flowing through the lines L", L' in the opposite direction to the previous line current and part continuing to flow directly through the lower part of the potentiometer to the battery B.

Marking and spacing signals are therefore transmitted to the outgoing line under the direct control of the relay 72 and since the current reversals in the line occur within the discharge tubes, relatively large currents may be supplied to the line without detrimental sparking and the current reversals may take place at a high rate.

While the relay 72 is shown, in the modification of Figures 1 and 3, as operated locally by a tape keyboard or other form of transmitter, it is to be understood that it may comprise the transmitting relay of a repeater set or may be operated in any desired manner. The discharge tubes may also be operated directly from the contacts of the transmitter.

It is obvious that other applications of the arc discharge tubes, of the nature herein described, to produce high speed current reversals in a line carrying large currents without the interruption of the circuit in air, will occur to others familiar with the art and therefore I do not desire to be limited to the exact arrangements shown and described.

What I claim is:

1. In a signaling system, a rotary transmitter having a plurality of segments, a line associated with said transmitter, means for applying potentials of different polarity to said segments for transmission to said line, said means comprising an electrostatically controlled arc discharge tube for each polarity of current to be applied to said transmitter, control circuits for said tubes for initiating a discharge therethrough in accordance with predetermined signals and means independent of said control circuits and including said segments for maintaining said discharge for predetermined intervals.

2. In a signaling system, a line circuit and means for applying current pulsations to said line circuit in accordance with predetermined signals, comprising an electrostatically controlled arc discharge tube for each polarity of current conductively coupled to said line, a control circuit for each of said tubes for initiating a discharge therethrough, means for energizing said control circuits in response to signals of definite polarity, to start a discharge through said tubes selectively and means for preventing the maintenance of a discharge through more than one of said tubes at a time.

3. In a signaling system, a line circuit and means for applying current reversals to said line circuit in accordance with predetermined signals, comprising an electrostatically controlled arc discharge tube for each polarity of current connected directly in said line, a control circuit for each of said tubes for initiating a discharge therethrough, means for energizing one of said control circuits in response to signals of a definite polarity, to start a discharge through one of said tubes and means operating in response to signals of the opposite polarity for discontinuing said discharge and starting a discharge through the other of said tubes.

4. In a signaling system, a source of periodic signals, a rotary transmitter operating in substantial synchronism with said signals, said transmitter having control rings and sending rings, means for applying potentials of different polarity to said sending rings comprising an electrostatically controlled arc discharge tube for each polarity of current to be applied thereto, means for initiating a discharge through said tubes in accordance with said signals, said means including the control ring and means independent of said control rings and including said sending rings for maintaining said discharge for a predetermined period.

5. In a signaling system, a line circuit, means for supplying telegraph signals of large current values to said line circuit comprising an arc discharge tube conductively connected in said line circuit, means for starting a discharge through said tube in response to low current telegraph signals and means for terminating said discharge, said latter means operating in substantial synchronism with said low current telegraph signals.

6. In a signaling system a source of periodic telegraph signals, distributing apparatus arranged to operate in substantial synchronism with said signals comprising control rings and sending rings, a gaseous conduction device in circuit with said sending rings for applying current of positive polarity thereto and a second gaseous conduction device in circuit with said sending rings for applying current of negative polarity thereto, a starting circuit for each of said tubes including said control rings, a signal responsive device in said starting circuits for selectively preparing said starting circuits in accordance with the nature of the periodic signals, said circuits being completed through said control ring to start a discharge through said tubes, to supply current of definite polarity to said sending rings.

7. In a signaling system a source of periodic telegraph signals, distributing apparatus arranged to operate in substantial synchronism with said signals comprising control rings and sending rings, a gaseous conduction device in circuit with said sending rings for applying current of positive polarity thereto and a second gaseous conduction device in circuit with said sending rings for applying current of negative polarity thereto, a starting circuit for each of said tubes including said control rings, a signal responsive device in said starting circuits for selectively preparing said starting circuits in accordance with the nature of the periodic signals, said circuits being completed through said control ring to start a discharge through said tubes, to supply current of definite polarity to said sending rings, and means for maintaining said discharge independently of said starting circuit and for discontinuing the same after a predetermined interval.

8. In a signaling system, a source of periodic telegraph signals, a line circuit, a gaseous conduction device conductively connected in said line circuit for applying current of positive polarity thereto and a second gaseous conduction device also conductively connected in said line circuit for applying current of negative polarity thereto, a starting circuit for each of said gaseous conduction devices, a signal responsive device in said starting circuits for selectively controlling said circuits in accordance with the nature of the periodic signals, to initiate a discharge through said gaseous conduction devices to supply current of definite polarity to said line circuit and means for discontinuing the discharge through one of said gaseous conduction devices at the time of or prior to the starting of a discharge through the other tube.

9. In a signaling system a source of periodic signals of marking and spacing character, a rotary transmitter operating in substantial synchronism with said periodic signals and having a plurality of segments, a line associated with said transmitter, means for applying a potential of definite polarity to said segments for transmission to said line, said means comprising an electrostatically controlled arc discharge tube, a control circuit for said tube, signal responsive means in said circuit for starting a discharge therethrough in accordance with said periodic signals and means for maintaining said discharge for a predetermined interval.

10. In a signaling system a source of periodic telegraph signals of marking and spacing character, distributing apparatus arranged to operate in substantial synchronism with said signals comprising control rings and sending rings, a gaseous conduction device in circuit with said sending rings for applying current of definite polarity thereto, a starting circuit for said tube including said control rings, a signal responsive device in said starting circuit for preparing said circuit in accordance with said periodic signals, said circuit being completed through said control ring to start a discharge through said tube to supply current of definite polarity to said sending rings and means for maintaining said discharge for a predetermined interval.

11. In a signaling system, a source of periodic signals of marking and spacing character, a rotary transmitter operating in substantial synchronism with said periodic signals and having a plurality of segments, a line associated with said transmitter, means for applying potentials of opposite polarity to said segments for transmission to said line, said means comprising a gaseous discharge tube having a trigger electrode, one of such tubes being provided for each polarity of current to be applied to said transmitter, control circuits for said tubes associated with said trigger electrodes for starting a discharge therethrough in accordance with the character of said periodic signals and means independent of said control circuits and including said segments for maintaining said discharges for predetermined intervals.

12. In a signaling system, a source of periodic signals, a rotary transmitter operating in substantial synchronism with said signals, said transmitter having control rings and sending rings, means for applying potentials of opposite polarity to said sending rings comprising a gaseous discharge tube having a trigger electrode, one of such tubes being provided for each polarity of current to be applied to said transmitter, a starting circuit including said control ring and trigger electrodes for initiating discharges through said tubes in accordance with said signals and means independent of said control circuit for maintaining said discharges for predetermined periods.

13. In a signaling system, a plurality of parallel signaling circuits, a transmitting mechanism including at least one gaseous conduction path common to said parallel signaling circuits and means for intermittently completing said signaling circuits through said common gaseous conduction path and interrupting the same in accordance with predetermined signaling conditions.

14. In a signaling system, a plurality of parallel signaling circuits, a transmitting mechanism common to said circuits and including at least one gaseous conduction device for each polarity of current to be transmitted and means for intermittently completing said signaling circuits through said gaseous conduction devices and interrupting the same selectively, in accordance with the polarity of the successive signal impulses.

15. In a signaling system, means for producing groups of uniform numbers of selecting conditions, a line circuit including an ionizable medium, means for initiating a discharge through said ionizable medium in accordance with said selecting conditions and means operating in substantial synchronism with said selecting conditions for interrupting the discharge through said medium.

16. In a signaling system, means for producing groups of uniform numbers of selecting conditions, a line circuit including a gaseous conduction path, means for starting a discharge across said path in accordance with said selecting conditions and means for intermittently interrupting the discharge across said path.

17. In a telegraph system, a distributor, start-stop mechanism therefor, means for producing groups of uniform numbers of successive selecting conditions, a circuit for said start-stop mechanism, an electron discharge device in said circuit, means operating in response to the first selecting condition of each group for initiating a discharge through said device and means for interrupting said discharge prior to the completion of the last selecting condition of each group.

18. In a telegraph system, a start-stop distributor, a source of periodic signals arranged in groups, each group having a uniform number of impulses, a plurality of gaseous conduction devices, means responsive to the first impulse of each group for initiating a discharge through one of said devices, to start said distributor into operation and means responsive to the succeeding impulses of the group for initiating a discharge through one or more additional gaseous conduction devices, for applying signals to the segments of said distributor.

19. In a telegraph signaling system, a source of periodic signals recurring in groups of a uniform number of impulses, a gaseous conduction device having starting characteristics differing from its operating characteristic, means responsive to said signals for applying starting conditions to said device, means for continuing the operation of said device after said starting conditions have been discontinued and means for interrupting the operation thereof prior to the application of the succeeding starting condition thereto.

In testimony whereof I affix my signature.

HAKON H. HAGLUND.